United States Patent
Lee et al.

(10) Patent No.: US 10,778,379 B2
(45) Date of Patent: Sep. 15, 2020

(54) UPLINK SIGNAL TRANSMISSION METHOD AND USER EQUIPMENT

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/316,612

(22) PCT Filed: Jul. 12, 2017

(86) PCT No.: PCT/KR2017/007453
§ 371 (c)(1),
(2) Date: Jan. 9, 2019

(87) PCT Pub. No.: WO2018/012874
PCT Pub. Date: Jan. 18, 2018

(65) Prior Publication Data
US 2019/0245657 A1 Aug. 8, 2019

Related U.S. Application Data

(60) Provisional application No. 62/361,492, filed on Jul. 12, 2016.

(51) Int. Cl.
*H04L 1/18* (2006.01)
*H04W 72/04* (2009.01)
(Continued)

(52) U.S. Cl.
CPC .............. *H04L 1/1819* (2013.01); *H04L 1/18* (2013.01); *H04L 1/1812* (2013.01);
(Continued)

(58) Field of Classification Search
CPC ....... H04L 1/18; H04L 1/1819; H04L 1/1835; H04W 72/0446; H04W 80/02; H04W 88/023
See application file for complete search history.

(56) References Cited

U.S. PATENT DOCUMENTS

2011/0134774 A1* 6/2011 Pelletier .............. H04W 52/365
370/252
2014/0040694 A1 2/2014 Verma et al.

FOREIGN PATENT DOCUMENTS

WO 2016041203 3/2016

OTHER PUBLICATIONS

PCT International Application No. PCT/KR2017/007453, Written Opinion of the International Searching Authority dated Oct. 20, 2017, 19 pages.

(Continued)

*Primary Examiner* — Gbemileke J Onamuti
(74) *Attorney, Agent, or Firm* — Lee Hong Degerman Kang Waimey

(57) ABSTRACT

According to the present invention, a user equipment (UE) receives semi-persistent scheduling (SPS) resource configuration information relating to SPS resources and receives an SPS command indicating activation or deactivation of the SPS resources. The UE flushes, in response to the SPS command, a buffer of an HARQ process associated with an SPS resource to transmit an SPS confirmation medium access control (MAC) control element (CE). The UE transmits a new MAC protocol data unit (PDU) including the SPS confirmation MAC CE on the SPS resource by using the HARQ process.

6 Claims, 8 Drawing Sheets

(51) Int. Cl.
*H04W 88/02* (2009.01)
*H04W 80/02* (2009.01)

(52) U.S. Cl.
CPC ........... *H04L 1/1835* (2013.01); *H04W 72/04* (2013.01); *H04W 72/0446* (2013.01); *H04W 80/02* (2013.01); *H04W 88/023* (2013.01)

(56) References Cited

OTHER PUBLICATIONS

Nokia, et al., "Feedback for SPS activation/deactivation", 3GPP TSG RAN WG2 Meeting #94, R2-163698, May 2016, 3 pages.
Catt, "Feedback for SPS activation and deactivation", 3GPP TSG RAN WG2 Meeting #94, R2-163475, May 2016, 3 pages.
Samsung, "Feedback for SPS activation/deactivation", 3GPP TSG RAN WG2 Meeting #94, R2-163671, May 2016, 6 pages.

\* cited by examiner (a) Control-Plane Protocol Stack (b) User-Plane Protocol Stack

UPLINK SIGNAL TRANSMISSION METHOD AND USER EQUIPMENT

CROSS-REFERENCE TO RELATED APPLICATIONS

This application is the National Stage filing under 35 U.S.C. 371 of International Application No. PCT/KR2017/007453, filed on Jul. 12, 2017, which claims the benefit of U.S. Provisional Application No. 62/361,492, filed on Jul. 12, 2016, the contents of which are all hereby incorporated by reference herein in their entirety.

TECHNICAL FIELD

The present invention relates to a wireless communication system, and more particularly, to a method for transmitting uplink signals and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting an uplink signal by a user equipment (UE). The method includes receiving semi-persistent scheduling (SPS) resource configuration information on SPS resources; receiving an SPS command indicating activation or release of the SPS resources; flushing a buffer of a hybrid automatic repeat and request (HARQ) process related to an SPS resource on which an SPS confirmation medium access control (MAC) control element (CE) is to be transmitted as a response to the SPS command; and transmitting a new MAC protocol data unit (PDU) including the SPS confirmation MAC CE on the SPS resource using the HARQ process.

According to another aspect of the present invention, provided herein is a user equipment (UE) for transmitting an uplink signal. The UE includes a radio frequency (RF) unit, and a processor configured to control the RF unit. The processor is configured to: control the RF unit to receive semi-persistent scheduling (SPS) resource configuration information on SPS resources; control the RF unit to receive an SPS command indicating activation or release of the SPS resources; flush a buffer of a hybrid automatic repeat and request (HARQ) process related to an SPS resource on which an SPS confirmation medium access control (MAC) control element (CE) is to be transmitted as a response to the SPS command; and control the RF unit to transmit a new MAC protocol data unit (PDU) including the SPS confirmation MAC CE on the SPS resource using the HARQ process.

In each aspect of the present invention, the UE may flush the HARQ buffer regardless of HARQ feedback for a current MAC PDU in the HARQ buffer and regardless of the number of transmissions performed for to the current MAC PDU in the HARQ buffer.

In each aspect of the present invention, the SPS resource on which the new MAC PDU is transmitted may be an SPS resource first occurring after subframe n in which the UE receives the SPS command.

In each aspect of the present invention, the UE may flush the HARQ buffer upon receiving the SPS command.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
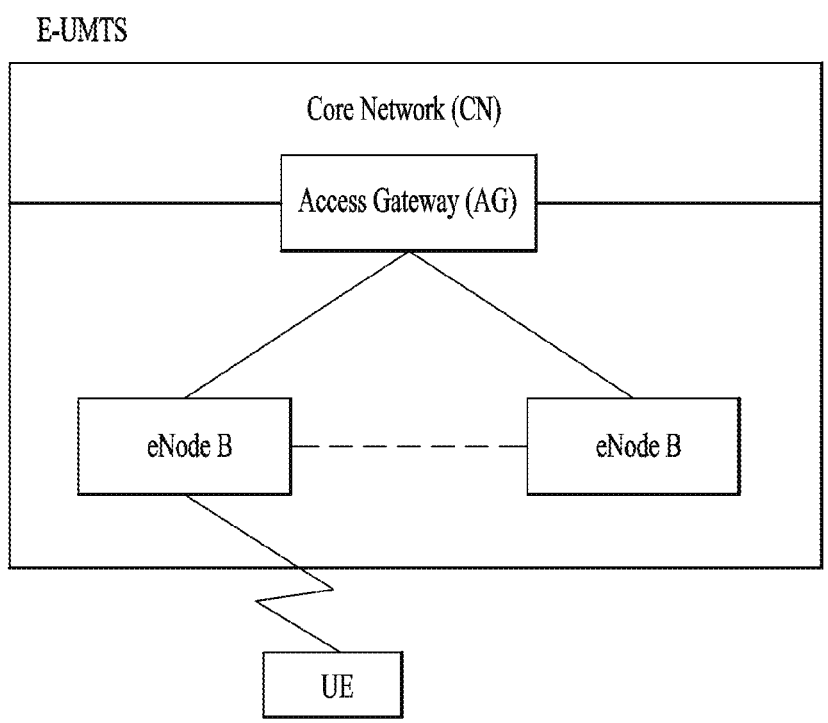
FIG. 1 is a block diagram illustrating network structure of an evolved universal mobile telecommunication system (E-UMTS).

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "NB-IoT" denotes narrow band internet of things (NB-IoT) which allows access to network services via E-UTRA with a channel bandwidth limited to 200 kHz, and "NB-IoT UE" refers to a UE that uses NB-IoT.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, a timing advance group (TAG) refers to a group of serving cells that is configured by RRC and that, for the cells with an UL configured, using the same timing reference cell. A TAG containing the SpCell of a MAC entity is referred to as primary TAG (pTAG), whereas the term secondary TAG (sTAG) refers to other TAGs.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
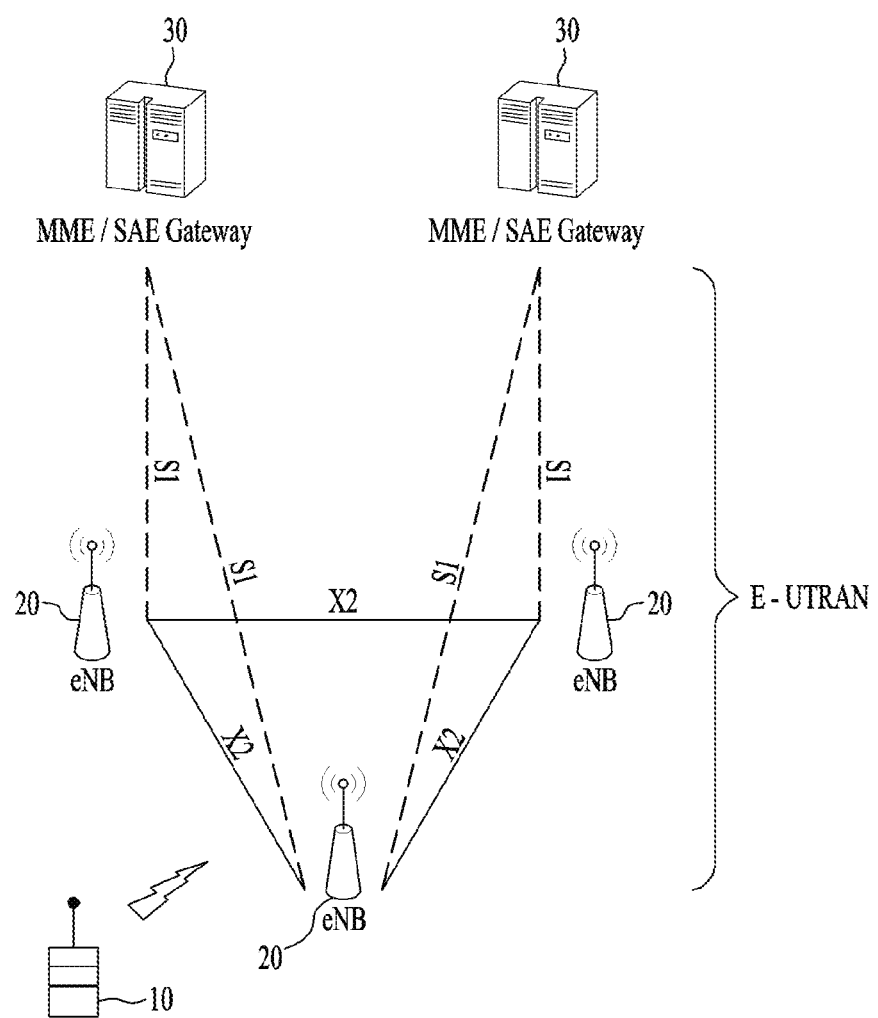
FIG. 2 is a block diagram illustrating a structure of an evolved-universal terrestrial radio access network (E-UTRAN).

FIG. 2 is a block diagram illustrating a structure of an evolved-universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
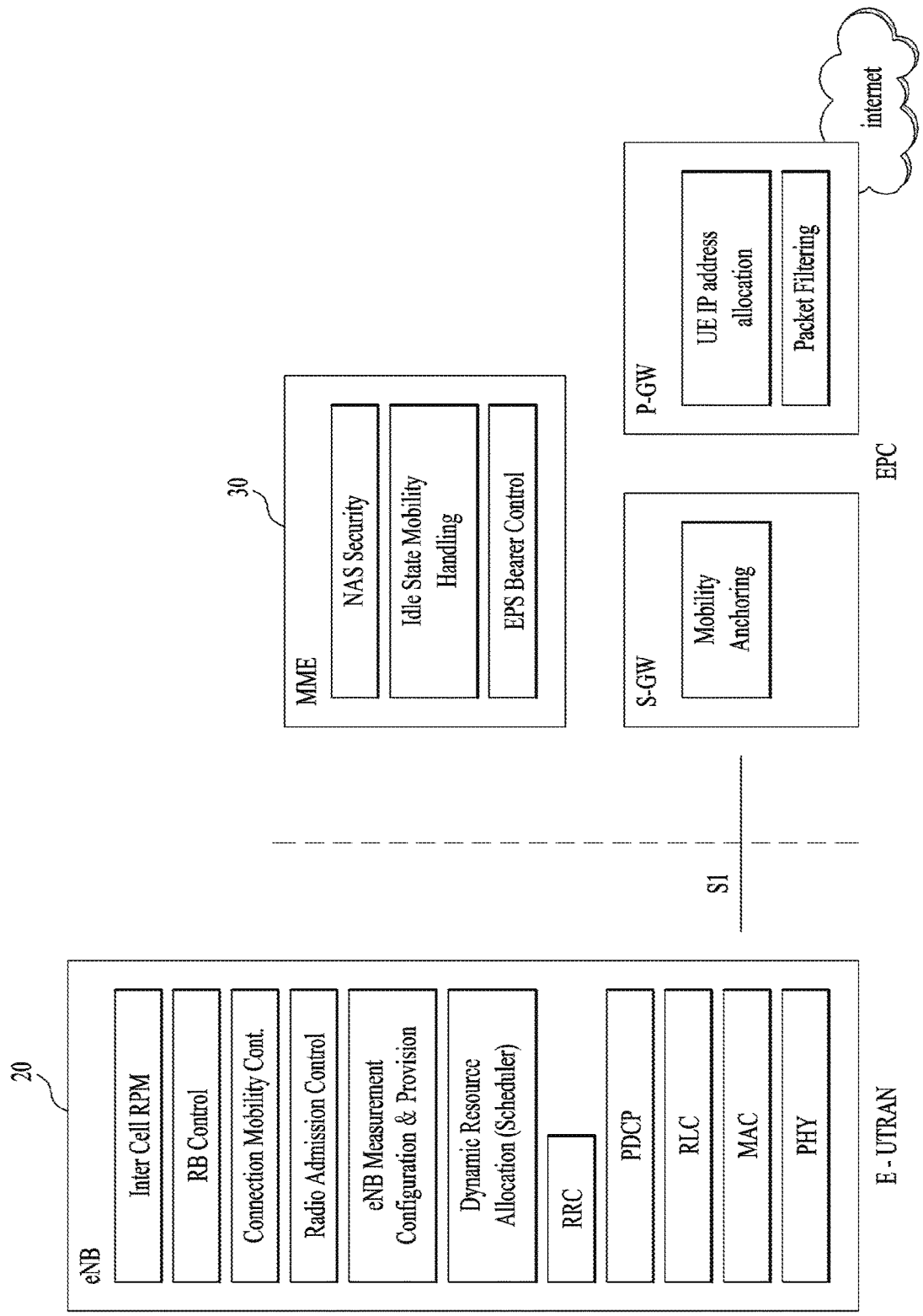
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
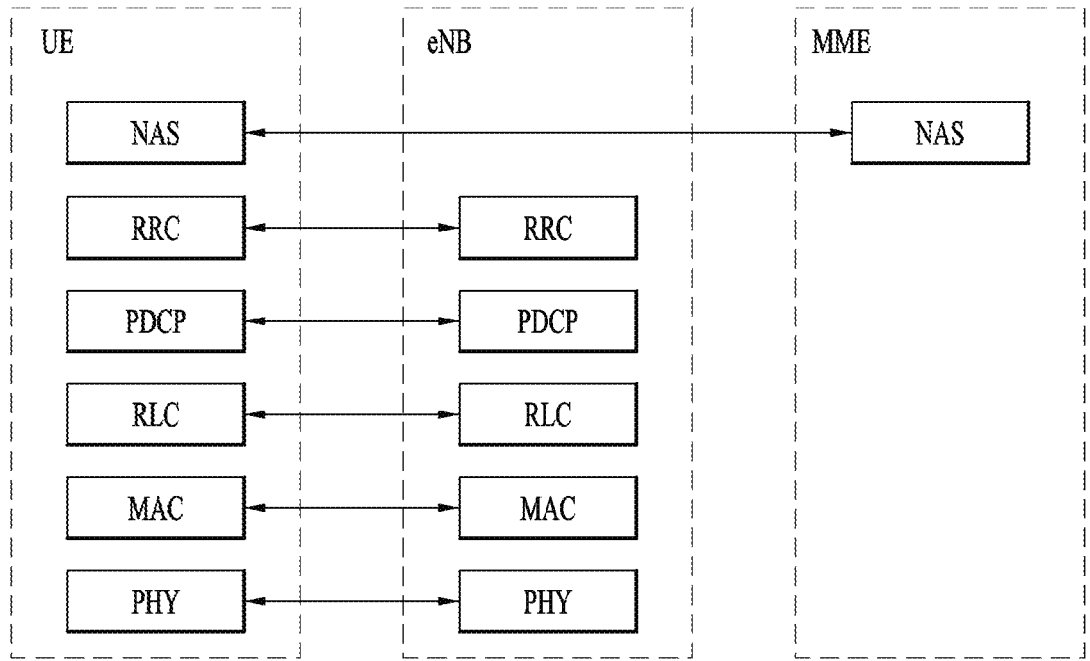
FIG. 4 is a diagram showing a control plane and a user plane of a radio interface protocol between a UE and an E-UTRAN based on a 3GPP radio access network standard.
Figure 4:
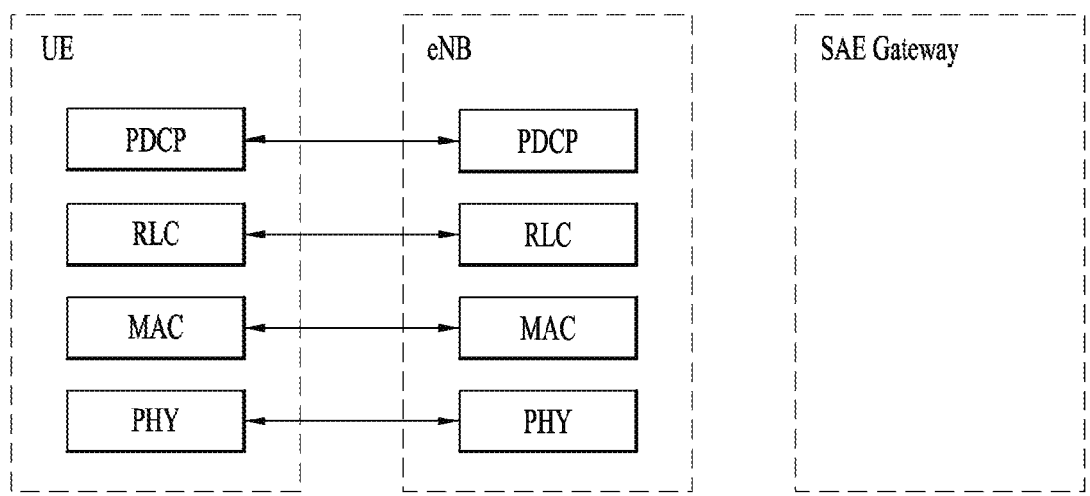

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
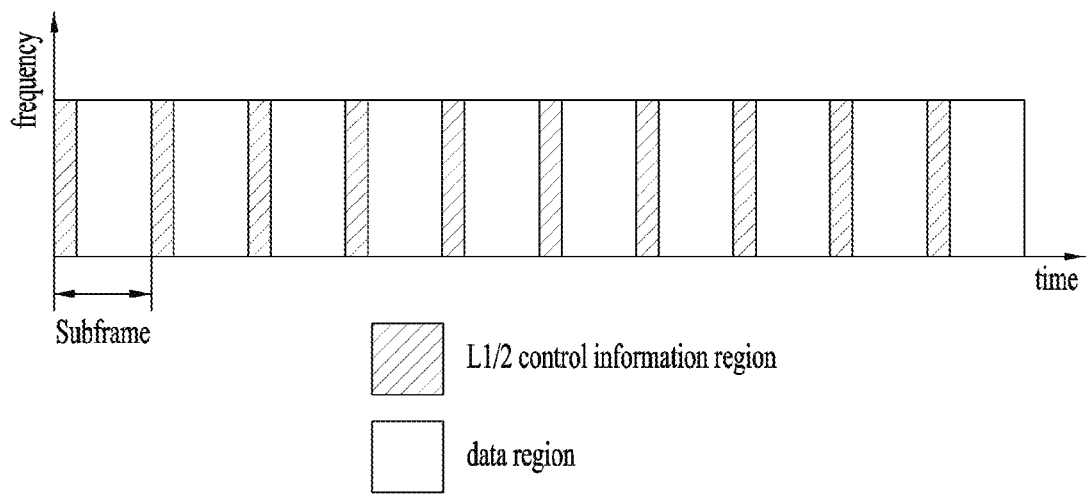
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
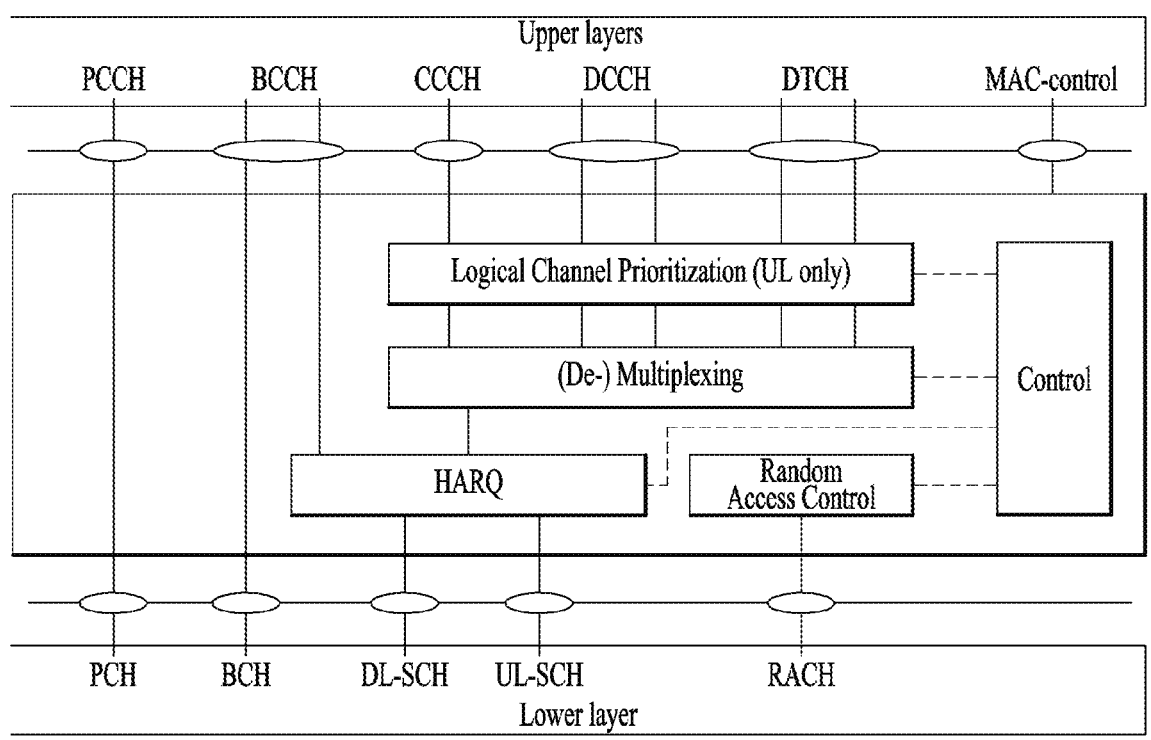
FIG. 6 is a diagram illustrating an overview of a MAC structure of a UE side.

FIG. 6 is a diagram illustrating an overview of a MAC structure of a UE side.

In LTE/LTE-A system, there are two types of scheduling according to scheduling interval: dynamic scheduling and semi-persistent scheduling. The dynamic scheduling by MAC schedules one TTI (1 ms: one subframe), and the semi-persistent scheduling (SPS) by RRC schedules multiple TTIs.

In the case of dynamic scheduling, the UE can get scheduling assignments/grants in every subframe. This gives the network full flexibility in assigning the resources to the UE at the cost of transmission of resource allocation information on PDCCH in every subframe. This also gives the flexibility of varying the resource allocation based on the reported channel conditions. The advantage of dynamic scheduling is basically the flexibility to alter the size of data in each subframe. In downlink direction resources are assigned when data is available. For data to be sent in the uplink, the UE dynamically requests transmission opportunities whenever data arrives in the UE's uplink buffer. Information about data being sent in downlink direction and uplink transmission opportunities are carried in a PDCCH/EPDCCH/MPDCCH.

While dynamic scheduling is great for bursty, infrequent and bandwidth consuming data transmissions (e.g. web surfing, video streaming, emails) it is less suited for real time streaming applications such as voice calls. For services such as VoIP, the packet size is small and the inter-arrival time of VoIP packets is constant (i.e., adaptive multi-rate (AMR) codec provides one packet every 20 ms during active period and one silence indicator (SID) at 160 ms). The control signaling overhead (PDCCH) is too much for the E-UTRAN in order to support a large number of VoIP users. The solution for this is semi-persistent scheduling (SPS). Instead of scheduling each uplink or downlink transmission, a transmission pattern is defined instead of single opportunities. In other words, the SPS is to allocate the resources at once and let the UE use these resources instead of allocating the resources dynamically. This significantly reduces the scheduling assignment overhead. The eNB can configure the UE with SPS at any time but, typically this is done at the time of dedicated bearer establishment for the VoIP service. SPS can be configured/re-configured by RRC at any time using SPS-Config. The information element (IE) SPS-Config is used by RRC to specify the semi-persistent scheduling configuration. The SPS-Config can include the configuration for semiPersistSchedC-RNTI, sps-ConfigDL and sps-ConfigUL. For a detailed description of parameters in SPS configuration information, reference is made to the standard document 3GPP TS 36.331.

When Semi-Persistent Scheduling is enabled using SPS-Config by RRC, the following information is provided:

Semi-Persistent Scheduling C-RNTI;

Uplink Semi-Persistent Scheduling interval semiPersistSchedIntervalUL and number of empty transmissions before implicit release implicitReleaseAfter, if Semi-Persistent Scheduling is enabled for the uplink;

Whether twoIntervalsConfig is enabled or disabled for uplink, only for TDD; and/or Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink.

SPS can be configured only in the uplink (sps-ConfigUL), or in the downlink (sps-ConfigDL) or in both directions. After a Semi-Persistent downlink assignment is configured, the MAC entity considers sequentially that the $N^{th}$ assignment occurs in the subframe for which: $(10*SFN+subframe)=[(10*SFN_{start\ time}+subframe_{start\ time}) N*semiPersistSchedIntervalDL]$ modulo 10240, where $SFN_{start\ time}$ and $subframe_{start\ time}$ are the SFN and subframe, respectively, at the time the configured downlink assignment were (re-) initialised (i.e., (re-)activated). For BL UEs or UEs in enhanced coverage $SFN_{start\ time}$ and $subframe_{start\ time}$ refer to SFN and subframe of the first transmission of PDSCH where configured downlink assignment was (re-) initialized. After a Semi-Persistent Scheduling uplink grant is configured, the MAC entity shall:

if twoIntervalsConfig is enabled by upper layer:
   set the Subframe_Offset according to Table 2 which presents Subframe_Offset values.
else:
   set Subframe_Offset to 0.
consider sequentially that the $N^{th}$ grant occurs in the subframe for which: $(10*SFN+subframe)= [(10*SFN_{start\ time}+subframe_{start\ time})+ N*semiPersistSchedIntervalUL+Subframe\_Offset*(N$ modulo 2)] modulo 10240, where $SFN_{start\ time}$ and subframe$_{start\ time}$ are the SFN and subframe, respectively, at the time the configured uplink grant were (re-)initialised.

TABLE 1

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | −1 |
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

The MAC entity clears the configured uplink grant immediately after implicitReleaseAfter number of consecutive new medium access control (MAC) protocol data units (PDUs) each containing zero MAC service data units (SDUs) have been provided by the Multiplexing and Assembly entity, on the Semi-Persistent Scheduling resource. Retransmissions for Semi-Persistent Scheduling can continue after clearing the configured uplink grant.

Configuration of SPS doesn't mean that the UE can start using SPS grants/assignments. The eNB has to explicitly activate SPS as explained below, in order for the UE to use SPS grants/assignments. So, SPS configuration and activation are two different things, eNB first configures the UE with SPS and then activates the same. The eNB can explicitly release SPS without release SPS RRC configuration. When configuring SPS in any direction either UL or DL, SPS C-RNTI is mandatorily provided by the eNB. Soon after the UE is configured with SPS C-RNTI, the UE is configured by higher layers to decode PDCCH with CRC scrambled by the SPS C-RNTI. A UE shall monitor PDCCH with CRC scrambled by the SPS C-RNTI in every subframe as the eNB can activate/re-activate/release SPS at any time using downlink control information (DCI). In a current LTE/LTE-A system, DCI format 0 is used to activate/release SPS on UL and DCI formats 1/1A/2/2A/2B/2C are used to activate/release SPS on DL. The 3GPP TS 36.213 document lists a validation procedure for activating/re-activating/re-leasing SPS as tables. The UE validates an SPS activation/release PDCCH only when special fields of DCI that the PDCCH carries are set to values defined for SPS activation/release in the 3GPP TS 36.213 document. Table 2 lists special fields for validating an SPS activation PDCCH/EPDCCH and Table 3 lists special fields for validating an SPS release PDCCH/EPDCCH.

TABLE 2

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |

TABLE 2-continued

|  | DCI format 0 | DCI format 1/1A | DCI format 2/2A/2B/2C/2D |
|---|---|---|---|
| Modulation and coding scheme | N/A | MSB is set to '0' | For the enabled transport block: MSB is set to '0' |
| Redundancy version | N/A | set to '00' | For the enabled transport block: set to '00' |

TABLE 3

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

For example, referring to Table 2, if a format of DCI carried by the PDCCH that the UE receives is DCI format 0 and special fields of DCI format 0 are set to values for SPS activation, the UE activates UL SPS resource(s). The UE may perform UL transmission in subframes configured by SPS-Config using resource block(s) indicated by a resource allocation field of DCI format 0. As another example, referring to Table 3, if a format of DCI carried by a PDCCH that the UE receives is DCI format 0 and special fields of DCI format 0 are set to values for SPS release, the UE releases UL SPS resource(s).

If SPS for UL or DL are disabled by RRC, a corresponding configured grant or configured allocation is discarded. In a legacy LTE/LTE-A system, SPS is supported only on an SpCell.

FIG. 6 is a diagram illustrating an overview of a MAC structure of a UE side.

A MAC layer supports the following functions: mapping between logical channels and transport channels; multiplexing of MAC SDUs belonging to one or different logical channels into transport blocks (TB) delivered to/from the physical layer on transport channels; demultiplexing of MAC SDUs belonging to one or different logical channels from transport blocks (TB) delivered to/from the physical layer on transport channels; scheduling information reporting (e.g., scheduling request, buffer status report); error correction through HARQ; priority handling between UEs by means of dynamic scheduling; priority handling between logical channels of one MAC entity; logical channel prioritization (LCP); transport format selection; 및 radio resource selection for sidelink (SL).

The MAC layer provides services to the RLC layer in the form of logical channels. A logical channel is defined by the type of information that the channel carries and is generally classified as a control channel, used for transmission of control and configuration information needed to operate an LTE system, or as a traffic channel, used for user data. A set of logical channel types defined for LTE includes a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH).

From the physical layer, the MAC layer uses services in the form of transport channels. A transport channel is defined by how and with what characteristics information is transmitted over a radio interface. Data on a transport channel is organized into transport blocks. In each transmission time interval (TTI), at most one transport block of dynamic size is transmitted over the radio interface to/from the UE in the absence of spatial multiplexing. In the case of spatial MIMO, up to two transport blocks per TTI may be transmitted.

Each transport block is associated with a transport format (TF) specifying how the transport block is to be transmitted over the radio interface. The TF includes information about a transport block size, a modulation and coding scheme, and antenna mapping. By varying the TF, the MAC layer may realize different data rates. Accordingly, rate control is also known as TF selection.

To support priority handling, multiple logical channels, wherein each logic channel has its own RLC entity, may be multiplexed into one transport channel by the MAC layer. At a receiver, the MAC layer handles corresponding demultiplexing and forwards RLC PDUs to respective RLC entities for in-sequence delivery and the other functions handled by the RLC. To support demultiplexing at the receiver, MAC is used. There is an associated subheader to each RLC PDU in a MAC header. The subheader includes an ID of a logical channel (LCID) from which the RLC PDU is originated and the length of a PDU in bytes. There is also a flag indicating whether this subheader is the last subheader or not. Together with the MAC header, one or multiple RLC PDUs and, if necessary, padding to meet a scheduled transport block size form one transport block which is forwarded to the physical layer.

In addition to multiplexing of different logical channels, the MAC layer may also insert so-called MAC control elements (CEs) into transport blocks to be transmitted over transport channels. A MAC CE is used for inband control signaling, for example, a timing-advance command and a random access response. CEs are identified with reserved values in an LCID field, wherein an LCID value indicates the type of control information.

In addition, a length field in the subheader is removed for CEs with a fixed length.

MAC multiplexing functionality is also responsible for handling of multiple component carriers in the case of carrier aggregation. The basic principle of carrier aggregation is independent process of component carriers in the physical layer, including control signaling, scheduling, hybrid-ARQ retransmission, whereas carrier aggregation is invisible to RLC and PDCP. Carrier aggregation is mainly seen in the MAC layer and logical channels including MAC CEs in the MAC layer are multiplexed to form one (or two in the case of spatial multiplexing) transport block(s) per component carrier having its own hybrid-ARQ entity.

Hereinafter, some procedures associated with UL-SCH transfer among MAC procedures will be described.

<UL Grant Reception>

In order to transmit on the UL-SCH the MAC entity must have a valid uplink grant (except for non-adaptive HARQ retransmissions) which it may receive dynamically on the PDCCH or in a random access response (RAR) or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
  if an uplink grant for this TTI and this Serving Cell has been received on the PDCCH for the MAC entity's C-RNTI or Temporary C-RNTI; or
  if an uplink grant for this TTI has been received in RAR:
    if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
      consider the new data indicator (NDI) to have been toggled for the corresponding HARQ process regardless of the value of the NDI.
    deliver the uplink grant and the associated HARQ information to the HARQ entity for this TTI.
  else, if this Serving Cell is the SpCell and if an uplink grant for this TTI has been received for the SpCell on the PDCCH of the SpCell for the MAC entity's Semi-Persistent Scheduling C-RNTI:
    if the NDI in the received HARQ information is 1:
      consider the NDI for the corresponding HARQ process not to have been toggled;
      deliver the uplink grant and the associated HARQ information to the HARQ entity for this TTI.
    else if the NDI in the received HARQ information is 0:
      if PDCCH contents indicate SPS release:
        clear the configured uplink grant (if any).
      else:
        store the uplink grant and the associated HARQ information as configured uplink grant;
        initialise (if not active) or re-initialise (if already active) the configured uplink grant to start in this TTI and to recur according to rules of uplink semi-persistent scheduling;
        if UL HARQ operation is asynchronous, set the HARQ Process ID to the HARQ Process ID associated with this TTI;
        consider the NDI bit for the corresponding HARQ process to have been toggled;
        deliver the configured uplink grant and the associated HARQ information to the HARQ entity for this TTI.
  else, if this Serving Cell is the SpCell and an uplink grant for this TTI has been configured for the SpCell:
    if UL HARQ operation is asynchronous, set the HARQ Process ID to the HARQ Process ID associated with this TTI;
    consider the NDI bit for the corresponding HARQ process to have been toggled;
    deliver the configured uplink grant, and the associated HARQ information to the HARQ entity for this TTI.

In the above description, the period of configured uplink grants is expressed in TTIs. For configured uplink grants, the HARQ Process ID associated with this TTI is derived from the following equation for asynchronous UL HARQ operation: HARQ Process ID=[floor(CURRENT_TTI/semiPersistSchedIntervalUL)] modulo numberOfConfUlSPS-Processes, where CURRENT_TTI=[(SFN*10)+subframe number] and it refers to the subframe where the first transmission of a bundle takes place.

<HARQ Operation>

HARQ is a method used for error control. HARQ-acknowledgement (ACK) transmitted on DL is used for error control regarding UL data and HARQ-ACK transmitted on UL is used for error control regarding DL data. On DL, an eNB schedules one or more resource blocks (RBs) for a UE selected according to a predetermined scheduling rule and transmits data to the UE using the scheduled RBs. On UL, the eNB schedules one or more RBs for a UE selected according to a predetermined scheduling rule and the UE transmits data using allocated resources on UL. A transmitting device performing a HARQ operation waits for an ACK signal after transmitting data (e.g., transport block, codeword). A receiving device performing the HARQ operation transmits the ACK signal only when the data has been correctly received and transmits a negative-ACK (NACK) signal when there is an error in the received data. Upon receiving the ACK signal, the transmitting device transmits subsequent (new) data while, upon receiving the NACK signal, the transmitting device retransmits data. In a HARQ scheme, error data is stored in a HARQ buffer and initial data is combined with subsequent retransmission data in order to raise reception success rate. The HARQ scheme is categorized as synchronous HARQ and asynchronous HARQ according to retransmission timing and as adaptive HARQ and non-adaptive HARQ depending on whether a channel state is considered during determination of retransmission resources. In the synchronous HARQ scheme, when initial transmission fails, retransmission is performed at a timing determined by a system. For example, if it is assumed that retransmission is performed in every X-th (e.g. X=4) time unit (e.g., a TTI or subframe) after initial transmission fails, the eNB and the UE do not need to exchange information about a retransmission timing. Therefore, upon receiving a NACK message, the transmitting device may retransmit corresponding data in every fourth time unit until an ACK message is received. In contrast, in the asynchronous HARQ scheme, the retransmission timing is determined by new scheduling or additional signaling. That is, the retransmission timing for error data may be changed by various factors such as channel state. In the non-adaptive HARQ scheme, a modulation and coding scheme (MCS), the number of RBs, etc., which are needed for retransmission, are determined as those during initial transmission. In contrast, in the adaptive HARQ scheme, the MCS, the number of RBs, etc. for retransmission are changed according to channel state. For example, in the non-adaptive HARQ scheme, when initial transmission is performed using 6 RBs, retransmission is also performed using 6 RBs. In contrast, in the non-adaptive HARQ scheme, even when initial transmission is performed using 6 RBs, retransmission may be performed using RBs less or greater in number than 6 according to channel state. Based on such classification, a combination of the four HARQ schemes may be considered but an asynchronous adaptive HARQ scheme and a synchronous non-adaptive HARQ scheme are mainly used. In the asynchronous adaptive HARQ scheme, the retransmission timing and retransmitted resources are adaptively changed according to channel state so as to maximize retransmission efficiency. However, overhead is increased. Meanwhile, in the synchronous non-adaptive HARQ scheme, since the retransmission timing and retransmission resource allocation are determined by the system, almost no overhead occurs but retransmission efficiency is very low if this scheme is used in an environment in which the channel state is considerably changed.

Meanwhile, a time delay occurs until the eNB receives ACK/NACK from the UE and transmits retransmission data after transmitting scheduling information and data according to the scheduling information. The time delay occurs due to a channel propagation delay or a time consumed for data decoding/encoding. Accordingly, if new data is transmitted after a HARQ process which is currently in progress is ended, a gap in data transmission occurs due to a time delay. In order to prevent a gap in data transmission from occurring during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a MAC layer. Each HARQ process manages state variables regarding the number of transmissions of a MAC PDU in the buffer, HARQ feedback for the MAC PDU in the buffer, a current redundancy version, etc.

In the current LTE/LTE-A system, on UL, synchronous HARQ is used except for some cases (e.g., NB-IoT, bandwidth limited (BL) UEs, UEs in enhanced coverage, Scells configured with UL licensed assisted access (LAA), and PUSCH enhancement mode) and the maximum number of retransmissions for synchronous HARQ is confiugred per UE. In the case of UL asynchronous adaptive HARQ, no HARQ feedback is sent and the UE follows what the PDCCH asks the UE to do. That is, the UE performs transmission or retransmission. In the current LTE/LTE-A system, a UL HARQ operation is governed by the following principles:

Regardless of the content of HARQ feedback (ACK or NACK), when a PDCCH for the UE is correctly received, the UE follows what the PDCCH asks the UE to do. That is, the UE performs transmission or retransmission (referred to as adaptive retransmission).

When no PDCCH addressed to a C-RNTI of the UE is detected, the HARQ feedback dictates how the UE performs retransmission: If the HARQ feedback is NACK, the UE performs non-adaptive retransmission, i.e., retransmission on the same UL resource as that used by the same process, and, if the HARQ feedback is ACK, the UE does not perform any UL (re)transmission and keeps data in the HARQ buffer.

1) HARQ Entity

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

In asynchronous HARQ operation, a HARQ process is associated with a TTI based on the received UL grant except for UL grant in RAR. Except for NB-IoT, each asynchronous HARQ process is associated with a HARQ process identifier. For UL transmission with UL grant in RAR, HARQ process identifier 0 is used. HARQ feedback is not applicable for asynchronous UL HARQ.

For each TTI, the HARQ entity shall:
identify the HARQ process(es) associated with this TTI, and for each identified HARQ process:
  if an uplink grant has been indicated for this process and this TTI:
    if the received grant was not addressed to a Temporary C-RNTI on PDCCH and if the NDI provided in the associated HARQ information has been toggled compared to the value in the previous transmission of this HARQ process; or
    if the uplink grant was received on PDCCH for the C-RNTI and the HARQ buffer of the identified process is empty; or
    if the uplink grant was received in a RAR:
      if there is a MAC PDU in the Msg3 buffer and the uplink grant was received in a RAR:
        obtain the MAC PDU to transmit from the Msg3 buffer.
      else:
        obtain the MAC PDU to transmit from the "Multiplexing and assembly" entity;
      deliver the MAC PDU and the uplink grant and the HARQ information to the identified HARQ process;
      instruct the identified HARQ process to trigger a new transmission.
    else:
      deliver the uplink grant and the HARQ information (redundancy version) to the identified HARQ process;
      instruct the identified HARQ process to generate an adaptive retransmission.
  else, if the HARQ buffer of this HARQ process is not empty:
    instruct the identified HARQ process to generate a non-adaptive retransmission.

2) HARQ Process

Each HARQ process is associated with a HARQ buffer.

For synchronous HARQ, each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated with modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

For synchronous HARQ, the MAC entity is configured with a maximum number of HARQ transmissions and a maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall:
  set HARQ_FEEDBACK to the received value.

If the HARQ entity requests a new transmission, the HARQ process shall:
  if UL HARQ operation is synchronous:
    set CURRENT_TX_NB to 0;
    set HARQ_FEEDBACK to NACK;
    set CURRENT_IRV to 0;
  store the MAC PDU in the associated HARQ buffer;
  store the uplink grant received from the HARQ entity;
  generate a transmission as described below.

If the HARQ entity requests a retransmission, the HARQ process shall:
  if UL HARQ operation is synchronous:
    increment CURRENT_TX_NB by 1;
  if the HARQ entity requests an adaptive retransmission:
    store the uplink grant received from the HARQ entity;
    set CURRENT_IRV to the index corresponding to the redundancy version value provided in the HARQ information;
    if UL HARQ operation is synchronous:
      set HARQ_FEEDBACK to NACK;
    generate a transmission as described below.
  else if the HARQ entity requests a non-adaptive retransmission:
    if UL HARQ operation is asynchronous or HARQ_FEEDBACK=NACK:
      generate a transmission as described below.

For asynchronous HARQ operation, UL retransmissions are triggered only by adaptive retransmission grants, except for retransmissions within a bundle.

To generate a transmission, the HARQ process shall:
  if the MAC PDU was obtained from the Msg3 buffer; or
  if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
  if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is no Sidelink Discovery Gap for Transmission in this TTI; or
  if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is a Sidelink Discovery Gap for Transmission, and there is no configured grant for transmission on SL-DCH in this TTI:
    instruct the physical layer to generate a transmission according to the stored uplink grant with the redundancy version corresponding to the CURRENT_IRV value;
    increment CURRENT_IRV by 1;
    if UL HARQ operation is synchronous and there is a measurement gap or Sidelink Discovery Gap for Reception at the time of the HARQ feedback reception for this transmission and if the MAC PDU was not obtained from the Msg3 buffer:

set HARQ_FEEDBACK to ACK at the time of the HARQ feedback reception for this transmission.

After performing above actions, if UL HARQ operation is synchronous the HARQ process then shall:
if CURRENT_TX_NB=maximum number of transmissions−1:
flush the HARQ buffer.

<Buffer Status Reporting Procedure>

The Buffer Status reporting procedure is used to provide the serving eNB with information about the amount of data available for transmission in the UL buffers associated with the MAC entity. A buffer status report (BSR) shall be triggered if any of the following events occur:
UL data, for a logical channel which belongs to a logical channel group (LCG), becomes available for transmission in the radio link control (RLC) entity or in the packet data convergence protocol (PDCP) entity (the definition of what data shall be considered as available for transmission is specified in 3GPP TS 36.322 and 3GPP TS 36.323 respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
UL resources are allocated and number of padding bits is equal to or larger than the size of the Buffer Status Report MAC control element plus its subheader, in which case the BSR is referred below to as "Padding BSR";
retxBSR-Timer expires and the MAC entity has data available for transmission for any of the logical channels which belong to a LCG, in which case the BSR is referred below to as "Regular BSR";
periodicBSR-Timer expires, in which case the BSR is referred below to as "Periodic BSR".

If the Buffer Status reporting procedure determines that at least one BSR has been triggered and not cancelled:
if the MAC entity has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered and logicalChannelSR-ProhibitTimer is not running:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

<Logical Channel Prioritization Procedure>

The Logical Channel Prioritization (LCP) procedure is applied when a new transmission is performed. RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR*TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR*BSD, where PBR and BSD are configured by upper layers.

The MAC entity shall perform the following LCP procedure when a new transmission is performed:
The MAC entity shall allocate resources to the logical channels in the following Steps:
Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
Step 2: the MAC entity shall decrement Bj by the total size of MAC SDUs served to logical channel j in Step 1 (NOTE: The value of Bj can be negative);
Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended (the conditions for when a radio bearer is considered suspended are defined in 3GPP TS 36.331).

The MAC entity multiplexes MAC CEs in a MAC PDU and MAC PDUs according to the LCP procedure.

Figure 7:
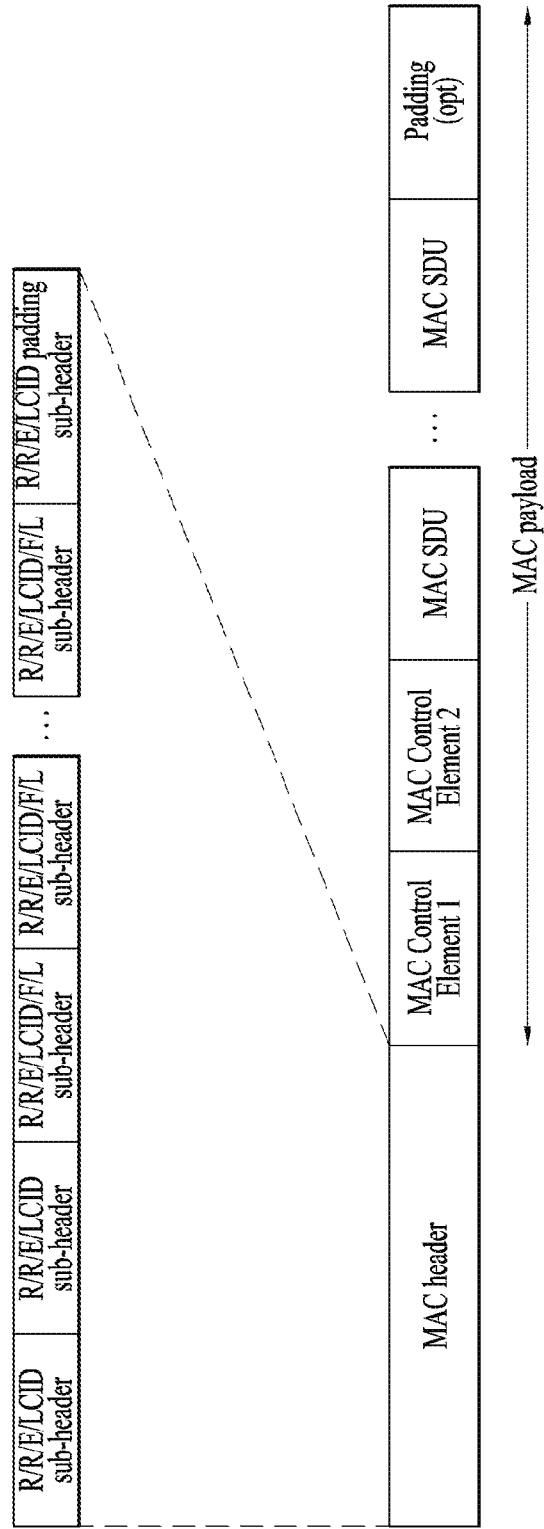
FIG. 7 is a diagram illustrating a MAC protocol data unit (PDU) including a medium access control (MAC) header, MAC control elements (CEs), a MAC service data unit (SDU), and padding.

FIG. 7 is a diagram illustrating a MAC PDU including a MAC header, MAC CEs, a MAC SDU, and padding. As illustrated in FIG. 7, the MAC PDU header includes one or more MAC PDU sub-headers and each sub-header corresponds to a MAC SDU, a MAC CE, or padding.

Conventionally, a HARQ buffer is flushed only when the HARQ buffer reaches the maximum number of retransmissions. Non-adaptive retransmission is performed based on the HARQ buffer and ACK/NACK. If the HARQ buffer is not empty and ACK is not received, the UE performs non-adaptive retransmission (see the above-described <HARQ operation>).

Meanwhile, in the legacy LTE/LTE-A system, if an SPS resource is activated and there is no UL data that the UE is to transmit, even a padding bit is transmitted using the activated SPS resource, i.e., an SPS grant. Therefore, in the legacy LTE/LTE-A system, when the eNB transmits an SPS activation PDCCH indicating activation of the SPS grant, even if the UE does not transmit ACK/NACK for the SPS activation PDCCH, the eNB may be aware that the SPS PDCCH has been correctly transmitted to the UE upon receiving a UL signal on the SPS resource.

In the legacy LTE/LTE-A system, a minimum value of SPS resource configuration periodicities (i.e., semiPersistSchedIntervalUL or semiPersistSchedIntervalDL) is 10 subframes, i.e., 10 ms, whereas, recently, permitting configuration of a UL SPS resource at a shorter periodicity than 10 ms has been considered in order to reduce a transmission delay using the SPS resource.

As mentioned above, in the legacy LTE/LTE-A system, if the SPS grant is activated, UL transmission should be performed using the activated SPS grant even if there is no UL data that the UE is to transmit. In this case, since the UE should perform UL transmission on an activated SPS resource regardless of whether there is available data in a UE buffer or not, unnecessary battery consumption occurs. As the configuration periodicity of the UL SPS resource becomes shorter, unnecessary battery consumption occurs more frequently. To solve this problem, if there is no data available for transmission in a buffer of the UE in which the SPS resource is configured, permitting the UE to skip UL transmission is taken into consideration. For example, the eNB may configure the UE so as to skip UL transmission for a configured UL grant in a specific situation, for example, in the case in which there is no data available for transmission in the UE buffer, by using a specific higher layer parameter. Hereinafter, the specific higher layer parameter is called skipUplinkTxSPS.

In the legacy LTE/LTE-A system, SPS is permitted only for initial transmission. When a UE for which an SPS resource is configured at a short periodicity is permitted to perform only initial transmission on the SPS resource, if a UL resource that the UE it to use for non-adaptive retransmission is overlapped with the SPS resource, the case in which the UE cannot perform non-adaptive retransmission may occur. Considering such a problem, permitting non-adaptive retransmission on the SPS resource is under discussion. Meanwhile, when the UE is configured to use skipUplinkTxSPS, if there is no new transmission to be performed on the UL SPS resource, a situation may occur in which the UE does not perform any UL transmission although there is an available SPS resource and there is non-adaptive retransmission that the UE is to perform. Particularly, if the SPS resource is configured at a short periodicity, a probability that a timing of non-adaptive retransmission overlaps with a transmission timing on the SPS resource increases. Therefore, if skipUplinkTxSPS is configured, prioritizing non-adaptive retransmission on the SPS resource over new transmission on the SPS resource is being considered.

Meanwhile, if the eNB fails to receive a UL signal from a UE for which skipUplinkTxSPS is configured on the SPS resource that the eNB commands to be activated, the eNB is not aware of whether the UL signal is not received on the SPS resource because UL data is not present in the UE buffer or because a PDCCH indicating SPS activation is lost. To solve this problem, introduction of an SPS confirmation MAC CE is considered as a new feedback mechanism for an SPS activation/release PDCCH. The SPS confirmation MAC CE is transmitted in correspondence to an SPS command, i.e., the PDCCH indicating SPS activation/release. For example, when the UE for which skipUplinkTxSPS is configured receives an SPS deactivation PDCCH (i.e., SPS release PDCCH), the UE may perform feedback for the SPS release PDCCH by transmitting the SPS confirmation MAC CE. After first transmission of the SPS confirmation MAC CE corresponding to the SPS release PDCCH, a corresponding SPS resource, i.e., a configured UL grant, is cleared. If the SPS confirmation MAC CE needs to be retransmitted, retransmission of the SPS confirmation MAC CE may continue after the configured UL grant is cleared. The SPS confirmation MAC CE may be used even as feedback for the SPS activation PDCCH.

To accurately transmit/receive a signal using an SPS resource between the eNB and the UE, it is important to maintain synchronization for an SPS state between the eNB and the UE. Considering this, it is desirable to prioritize transmission of the SPS confirmation MAC CE over non-adaptive retransmission. That is, it is desirable to prioritize non-adaptive retransmission over new transmission except for transmission of the SPS confirmation MAC CE. In summary, new transmission for transmitting the SPS confirmation MAC CE is prioritized over non-adaptive retransmission, wherein new transmission for transmitting other MAC CEs such as data or BSR/power headroom report (PHR) from a logical channel is deprioritized over non-adaptive retransmission.

A MAC entity is in charge of determination of new transmission or retransmission. However, a HARQ entity is not aware of the content of a MAC PDU. Consequently, upon determining whether new transmission is prioritized or non-adaptive retransmission is prioritized, the HARQ entity cannot consider the content of the MAC PDU, for example, the presence of the SPS confirmation MAC CE in the MAC PDU. Therefore, if a HARQ buffer is not empty and the SPS confirmation MAC CE needs to be transmitted, a new mechanism for triggering new transmission instead of non-adaptive retransmission is needed. The new mechanism should be capable of triggering non-adaptive retransmission when transmission is not for the SPS confirmation MAC CE. That is, when it is necessary to transmit the SPS confirmation MAC CE, a mechanism is needed in which the SPS confirmation MAC CE is prioritized over non-adaptive retransmission and non-adaptive retransmission is prioritized over normal new transmission except for transmission of the SPS confirmation MAC CE.

As one of new mechanisms, if the MAC entity configured with skipUplinkTxSPS receives the PDCCH indicating SPS release, the MAC entity may trigger the SPS confirmation MAC CE and, if a UL grant for a corresponding TTI is configured, the MAC entity may regard an NDI bit for a corresponding HARQ process as having been toggled and deliver the configured UL grant and the associated HARQ information to the HARQ entity for the TTI. For example, an operation when the NDI in received HARQ information is 0 among operations of the MAC entity described in the above section of <UL grant reception> may be considered to be changed as follows.

else if the NDI in the received HARQ information is 0:
  if PDCCH contents indicate SPS release:
    if the MAC entity is configured with skipUplinkTx-SPS:
      trigger an SPS confirmation MAC Control Element;
      if an uplink grant for this TTI has been configured for the SpCell:
        consider the NDI bit for the corresponding HARQ process to have been toggled;
        deliver the configured uplink grant and the associated HARQ information to the HARQ entity for this TTI.
    else:
      clear the configured uplink grant (if any).

However, even when this mechanism is performed, if the HARQ entity operates according to "1) HARQ entity" described in <UL grant reception>, there is a problem in that the SPS confirmation MAC CE is not always prioritized over non-adaptive retransmission. Referring to "1) HARQ entity" described in <UL grant reception>, this is because the HARQ entity instructs an identified HARQ process to generate non-adaptive transmission if the HARQ buffer of the HARQ process is not empty. Considering this point, if the MAC entity is configured with short semiPersistSchedIntervalUL, a mechanism for causing the HARQ entity to operate as follows is considered.

For each TTI, the HARQ entity shall:
  identify the HARQ process(es) associated with this TTI, and for each identified HARQ process:
    if an uplink grant has been indicated for this process and this TTI:
      if the received grant was not addressed to a Temporary C-RNTI on PDCCH and if the NDI provided in the associated HARQ information has been toggled compared to the value in the previous transmission of this HARQ process; or
      if the uplink grant was received on PDCCH for the C-RNTI and the HARQ buffer of the identified process is empty; or
      if the uplink grant was received in a RAR:
        if there is a MAC PDU in the Msg3 buffer and the uplink grant was received in a RAR:
          obtain the MAC PDU to transmit from the Msg3 buffer.
        else if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK; or if the MAC entity is configured with ul-SchedInterval shorter than 10 subframes and if the uplink grant is a preallocated uplink grant, and if the HARQ buffer of the identified HARQ process is not empty, and if HARQ_FEEDBACK of the identified HARQ process is NACK:
          instruct the identified HARQ process to generate a non-adaptive retransmission.
        else:
          obtain the MAC PDU to transmit from the "Multiplexing and assembly" entity, if any;
          if a MAC PDU to transmit has been obtained:
          deliver the MAC PDU and the uplink grant and the HARQ information to the identified HARQ process;
          instruct the identified HARQ process to trigger a new transmission.

Even when the MAC entity triggers the SPS confirmation MAC CE and the NDI bit for a corresponding HARQ process is considered to have been toggled, according to the mechanism, if the MAC entity is configured with semiPersistSchedIntervalUL shorter than 10 subframes, the UL grant is a configured grant, the HARQ buffer of an identified HARQ process is not empty, and HARQ_FEEDBACK of the identified HARQ process is NACK, the HARQ entity instructs the identified HARQ process to generate non-adaptive retransmission. That is, according to the mechanism, non-adaptive retransmission is prioritized over new transmission for the SPS confirmation MAC CE.

The present invention proposes that the UE flush the HARQ buffer of the HARQ process related to an SPS resource if the UE should transmit SPS feedback in response to an SPS command for SPS activation/release in order to prioritize transmission of the SPS confirmation MAC CE over non-adaptive retransmission. For example, if the UE receives the SPS command for SPS activation or SPS release, the UE generates SPS feedback in response to the SPS command and flushes the HARQ buffer of the HARQ process associated with an SPS resource on which the generated SPS feedback is to be transmitted.

The UE receives SPS resource configuration information including an SPS interval (e.g., semiPersistSchedIntervalUL or semiPersistSchedIntervalDL) from a network. Upon receiving the SPS resource configuration information, the UE stores the information but does not immediately start data transmission using the SPS resource. The UE receives the SPS command indicating SPS (re)activation (i.e., (re)initialization) and generates SPS grants, i.e., SPS resources, according to the SPS resource configuration information. The UE starts to use the SPS grants to transmit or receive data. Upon receiving the SPS command indicating SPS release, the UE clears all SPS grants and stops using the SPS grants to transmit or receive data.

Figure 8:
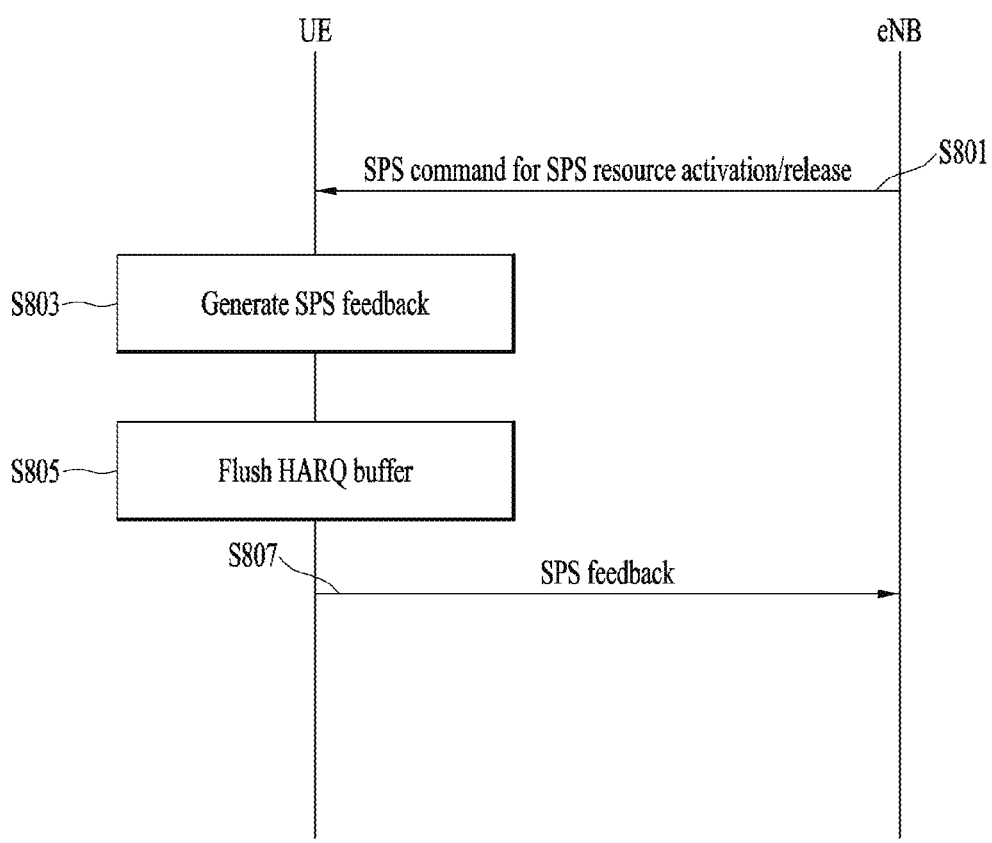
FIG. 8 illustrates SPS feedback transmission according to the present invention.

FIG. 8 illustrates SPS feedback transmission according to the present invention.

Upon receiving an SPS command indicating SPS (re)activation/release (S801), the UE:
  generates SPS feedback, i.e., an SPS conformation MAC CE, indicating that the SPS command has been successfully received from the network (S803); and
  flushes a HARQ buffer of a HARQ process (S805): The UE perform new transmission of the generated SPS feedback (S807), using a HARQ process associated with an SPS grant for transmission of the generated SPS feedback, i.e., a HARQ process associated with an SPS grant to be used to transmit the generated SPS feedback, all HARQ processes associated with all SPS grants, or all HARQ processes of the UE; and
  a HARQ process in which the HARQ buffer has been flushed.

In the case of SPS (re)activation, the UE may transmit the generated SPS feedback using the following SPS grant:
  an SPS grant occurring in a subframe in which a UL grant for SPS activation is present;
  the first or earliest SPS grant occurring after a subframe in which the SPS command is received;
  the first or earliest SPS grant occurring after a subframe in which the UL grant for SPS activation is present;
  the first or earliest SPS grant occurring after a subframe in which a PDCCH for SPS activation is received;

the first or earliest SPS grant occurring after N subframes from subframe n in which the SPS command is received, i.e., in or after subframe n+N;

the first or earliest SPS grant occurring after N subframes from subframe n in which the UL grant for SPS activation is present, i.e., in or after subframe n+N; or the first or earliest SPS grant occurring after N subframes from subframe n in which the PDCCH for SPS activation is received, i.e., in or after subframe n+N.

Herein, the subframe in which the UL grant for SPS activation is present implies a subframe in which the UL grant occurs according to a PDCCH indicating UL SPS activation. For example, in FDD, when the UE receives DCI format 0 which is set to indicate SPS activation in subframe n, the UL grant for SPS activation may be present in subframe n+4.

In the case of SPS release, the UE may transmit the generated SPS feedback using the following SPS grant:

an SPS grant occurring in a subframe in which a UL grant for SPS release is present;

the first or earliest SPS grant occurring after a subframe in which the SPS command is received;

the first or earliest SPS grant occurring after a subframe in which the UL grant for SPS release is present;

the first or earliest SPS grant occurring after a subframe in which a PDCCH for SPS release is received;

the first or earliest SPS grant occurring after N subframes from subframe n in which the SPS command is received, i.e., in or after subframe n+N;

the first or earliest SPS grant occurring after N subframes from subframe n in which the UL grant for SPS release is present, i.e., in or after subframe n+N; or the first or earliest SPS grant occurring after N subframes from subframe n in which the PDCCH for SPS release is received, i.e., in or after subframe n+N.

The UE may flush the HARQ buffer at the following timing point:

when the UE receives the SPS command indicating SPS (re)activation/release;

in a subframe in which the UL grant for SPS (re)activation/release is present;

when an SPS resource is reactivated according to the SPS command for (re) activation; or when the UE generates SPS feedback in response to the SPS command.

In this case, the subframe in which the UL grant for SPS release is present implies a subframe in which the UL grant occurs according to the PDCCH indicating UL SPS release. For example, in FDD, when the UE receives DCI format 0 which is set to indicate SPS release in subframe n, this may mean that the UL grant for SPS release is present in subframe n+4.

Hereinabove, while SPS feedback transmission using the SPS grant has been described, SPS feedback may be transmitted using the UL grant caused by dynamic scheduling.

When the HARQ buffer is flushed according to the present invention, the UE flushes the HARQ buffer even when ACK for a MAC PDU which has already been stored in the HARQ buffer is not received. That is, the UE flushes the HARQ buffer even when non-adaptive retransmission data is present in the HARQ buffer. When the UE flushes the HARQ buffer according to the present invention, the UE flushes the HARQ buffer even when retransmission does not reach the maximum number of retransmissions with respect to a corresponding HARQ process.

A process for transmitting SPS feedback for SPS activation by the UE is described below.

Step 1. The UE receives SPS resource configuration information through an RRC message;

Step 2. The UE receives an SPS command for activating an SPS resource through a PDCCH signal;

Step 3. The UE activates SPS resource(s) according to the SPS resource configuration information.

Step 4. The UE identifies the first SPS grant occurring after a HARQ process to be used for transmission of a MAC PDU including the SPS feedback, i.e., after reception of the SPS command;

Step 5. The UE flushes the HARQ buffer of the identified HARQ process;

Step 6. The UE generates a MAC PDU including the SPS feedback as a response to the SPS command;

Step 7. The UE stores the MAC PDU including the SPS feedback in the HARQ buffer of the identified HARQ process;

Step 8. The UE transmits the MAC PDU including the SPS feedback to the eNB as new transmission.

A process for transmitting SPS feedback for SPS release by the UE is described below.

Step 1. The UE is using SPS resources;

Step 2. The UE receives an SPS command for releasing SPS resources through a PDCCH signal;

Step 3. The UE identifies the earliest SPS grant occurring after a HARQ process to be used for transmission of a MAC PDU including the SPS feedback, i.e., after 4 subframes from subframe n in which the SPS command indicating SPS release is received, i.e., in or after subframe n+4;

Step 4. The UE flushes the HARQ buffer of the identified HARQ process;

Step 5. The UE generates a MAC PDU including the SPS feedback as a response to the SPS command;

Step 6. The UE stores the MAC PDU including the SPS feedback in the HARQ buffer of the identified HARQ process;

Step 7. The UE transmits the MAC PDU including the SPS feedback to the eNB as new transmission;

Step 8. The UE releases all SPS resources.

According to the present invention, the MAC entity is specified in the 3GPP TS 36.321 document to operate as follows.

If Skip UplinkTxSPS is configured, the MAC entity:
flushes a HARQ buffer of a HARQ process associated with the first configured UL grant (i.e., $0^{th}$ grant) when a configured UL grant is (re)initialized; or
flushes a HARQ buffer of a HARQ process associated with the earliest UL grant occurring after 4 subframes from subframe n in which a PDCCH indicating SPS release is received, i.e., in or after subframe n+4, when the PDCCH indicating SPS release is received.

The operation of the UE varies depending on whether new transmission should be performed or retransmission should be performed. For example, in the case of retransmission, the UE transmits a MAC PDU which has already been stored in the HARQ buffer by changing only a redundancy version (RV) or with a specific RV (e.g., RV=0). In contrast, in the case of new transmission, the UE generates a new MAC PDU and transmits the generated MAC PDU. If the MAC entity flushes the HARQ buffer according to the present invention when an SPS confirmation MAC CE should be transmitted, the UE newly generates a MAC PDU including the SPS confirmation MAC CE because there is no PDU to be retransmitted. Therefore, according to the present invention, the SPS confirmation MAC CE is guaranteed to be preferentially transmitted over non-adaptive retransmission.

Figure 9:
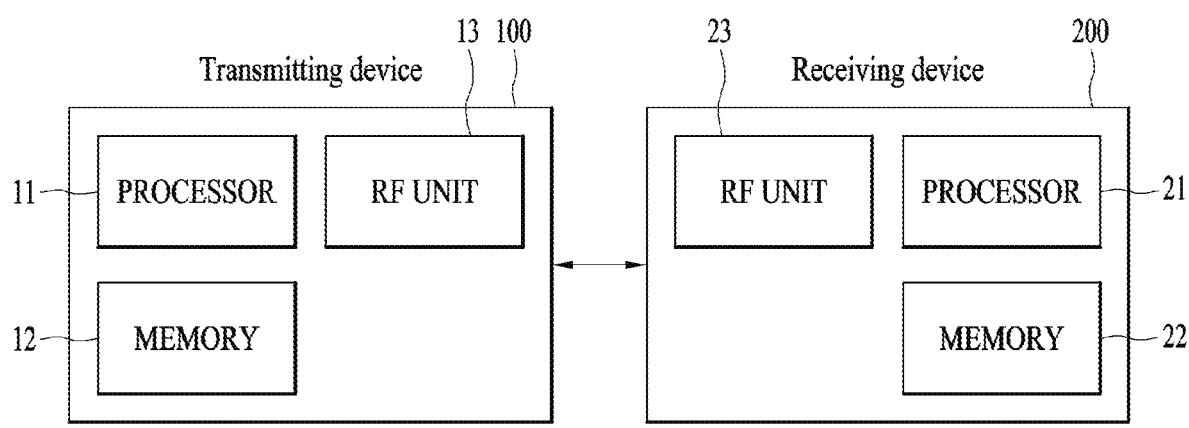
FIG. 9 is a block diagram illustrating elements of a transmitting device 100 and a receiving device 200 for implementing the present invention.

FIG. 9 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor according to the present invention may control the RF unit to receive SPS resource configuration information about semi-persistent scheduling (SPS) resources. The UE processor may control the RF unit to receive an SPS command indicating activation or release of the SPS resources. The UE processor may be configured to flush a HARQ buffer of a HARQ process associated with an SPS resource on which feedback for the SPS command, i.e., an SPS confirmation MAC CE, is to be transmitted. The UE processor may control the RF unit to transmit a new MAC protocol data unit (PDU) including the SPS confirmation MAC CE on the SPS resource using the HARQ process. The UE processor may be configured to flush the HARQ buffer regardless of HARQ feedback for a current MAC PDU in the HARQ buffer and regardless of the number of transmissions performed with respect to the current MAC PDU in the HARQ buffer. The UE processor may determine the SPS resource used for transmission of the new MAC PDU based on a subframe in which the SPS command is received.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

What is claimed is:

1. A method of transmitting an uplink signal by a user equipment (UE), the method comprising:
   receiving semi-persistent scheduling (SPS) resource configuration information on SPS resources;
   receiving an SPS command for activation of the SPS resources;
   based on receiving the SPS command, flushing a hybrid automatic repeat and request (HARQ) buffer of a HARQ process related to an uplink resource on which an SPS confirmation medium access control (MAC) control element (CE) is to be transmitted as a response to the SPS command; and
   transmitting a new MAC protocol data unit (PDU) including the SPS confirmation MAC CE on the uplink resource based on the HARQ process.

2. The method of claim 1,
   wherein the UE flushes the HARQ buffer regardless of a HARQ feedback for a MAC PDU stored in the HARQ buffer and regardless of the number of transmissions performed for the MAC PDU stored in the HARQ buffer.

3. The method of claim 1,
   wherein the uplink resource on which the new MAC PDU is transmitted is an SPS resource first occurring after subframe n in which the UE receives the SPS command.

4. A user equipment (UE) for transmitting an uplink signal, the UE comprising:
   a radio frequency (RF) transceiver;
   a processor; and
   a computer memory storing at least one program which, when executed, causes the processor to perform operations comprising:
   receiving semi-persistent scheduling (SPS) resource configuration information on SPS resources;
   receiving an SPS command for activation of the SPS resources;
   based on receiving the SPS command, flushing a hybrid automatic repeat and request (HARQ) buffer of a HARQ process related to an uplink resource on which an SPS confirmation medium access control (MAC) control element (CE) is to be transmitted as a response to the SPS command; and
   transmitting a new MAC protocol data unit (PDU) including the SPS confirmation MAC CE on the uplink resource based on the HARQ process.

5. The UE of claim 4, wherein flushing the HARQ buffer based on receiving the SPS command comprises:
   flushing the HARQ buffer regardless of a HARQ feedback for a MAC PDU stored in the HARQ buffer and regardless of the number of transmissions performed for the MAC PDU stored in the HARQ buffer.

6. The UE of claim 4,
   wherein the uplink resource on which the new MAC PDU is transmitted is an SPS resource first occurring after subframe n in which the UE receives the SPS command.

* * * * *